United States Patent
Backus

(10) Patent No.: US 6,305,276 B1
(45) Date of Patent: Oct. 23, 2001

(54) APPARATUS FOR EXTRACTING CREAMED CORN

(76) Inventor: Marvin J. Backus, Rte. 23, Box 1263, Lake City, FL (US) 32025

( * ) Notice: Subject to any disclaimer, the term of this patent is extended or adjusted under 35 U.S.C. 154(b) by 0 days.

(21) Appl. No.: 09/455,253

(22) Filed: Dec. 6, 1999

(51) Int. Cl.[7] ............................. A01F 11/06; A23N 15/02; A47J 17/16
(52) U.S. Cl. ................... 99/514; 99/574; 99/580; 99/589; 99/567; 460/45; 460/58
(58) Field of Search .............................. 99/567, 514, 574, 99/575, 580, 589, 586; 460/45, 46, 58

(56) References Cited

U.S. PATENT DOCUMENTS

| | | | |
|---|---|---|---|
| 14,771 | * | 4/1856 | Mathers . |
| 19,253 | * | 2/1858 | Lindner . |
| 77,494 | * | 5/1868 | Jones . |
| 240,052 | * | 4/1881 | Stover . |
| 1,127,548 | * | 2/1915 | Turner . |
| 2,063,483 | * | 12/1936 | Bulmer ..................................... 130/9 |
| 2,326,873 | * | 8/1943 | Meek ........................................ 146/4 |
| 2,477,445 | * | 7/1949 | Ewertz ..................................... 130/8 |
| 2,566,568 | * | 9/1951 | Ives ........................................... 130/9 |
| 2,998,833 | * | 9/1961 | Kosmerl ................................... 146/4 |
| 5,097,758 | * | 3/1992 | Fresh ..................................... 99/590 |

* cited by examiner

Primary Examiner—Keith Hendricks
Assistant Examiner—Drew Becker
(74) Attorney, Agent, or Firm—Arthur G. Yeager

(57) ABSTRACT

An apparatus for cutting kernels of fresh corn from ears thereof and recovering kernels and cream therefrom for eating or preserving for future eating. The apparatus comprises a hand-held electric drill having a drill bit adapted to grip the ear at its stalk-end while the drill rotates the ear about the axis of the drill while pressing the ear into cutting tube having screw points projecting inwardly thereof causing said kernels to be ripped from the ear and discharged along with corn cream downwardly by gravity into a receiver for further processing.

7 Claims, 2 Drawing Sheets

APPARATUS FOR EXTRACTING CREAMED CORN

CROSS-REFERENCE TO RELATED APPLICATIONS

Not Applicable

FEDERALLY SPONSORED RESEARCH OR DEVELOPMENT

Not Applicable

BACKGROUND OF THE INVENTION (1) Field of the Invention

This invention relates to an apparatus for cutting edible kernels of corn from fresh ears; and more particularly, it relates to such an apparatus driven by an electric drill.

(2) Description of Related Art

It has been the practice of those wishing to prepare creamed corn for eating to cut the kernels from the cob with a knife slicing lengthwise of the cob so as to cut the corn kernel away from the cob and retrieve the kernel and the accompanying cream to be heated and eaten as food. A cutting action with a knife was necessary to recover chewable bits of the corn; any rough abrasive action in place of the cutting knife reduced the corn kernel to mush to produce a nourishing, but tasteless, food.

There is found in the prior patent art U.S. Pat. No. 4,892,034 issued to C. B. Miles a utensil intended for use in cutting kernels from an ear of corn and to facilitate the recovery of the cut kernels and the cream for use as human food. The apparatus is a U-shaped trough for receiving an ear of corn laid horizontally over a sharp blade resembling the blade of a wood-working plane projecting up into the trough. The ear of corn is manually moved back and forth over the blade to scrape the kernels and the cream away from the cob to be recovered in a vessel below the trough. Depending on the sharpness of the knife blade the recovered product may include cut kernels or mush.

BRIEF SUMMARY OF THE INVENTION

This invention is an apparatus for cutting kernels of corn from fresh ears of corn and recovering the cut kernels and the cream therefrom. The apparatus includes a variable speed reversible electric drill fitted with a special drill bit for holding an ear of corn by its cut end with the tip of the ear pointing lengthwise axially forward of the drill. The drill is turned on to rotate the ear of corn and the rotating ear is pushed into a tubular cutting cylinder to shear off kernels of corn and recover the escaping cream and the cut kernels.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Corn is a food that is universally eaten by all people, and it is grown all over the world where the weather is warm enough to foster the growth of grains of all kinds and vegetables of all kinds. In the United States of America corn is grown over the entire country, although the weather is better for such a crop in the midwestern plains than it is in the coastal regions. Accordingly, this food product is preserved by canning and by freezing techniques, so that it is available at times other than when the corn has ripened on the stalk and must be picked. At the time when corn is ripened and ready to be picked (mid to late summer) the ears of corn must be picked and stripped of its food values that are then canned or frozen for use later. The stripping of corn kernels and the accompanying cream is somewhat of a delicate operation, if one wishes to recover the best of the food values. The kernels of corn preferably are cut from the cob with a sharp knife so as to cut the kernel away cleanly without too much destruction of the kernel. Cream is inside the kernel and it will empty out if the kernel wall is pierced. It therefore is best to cut the kernel from the cob with only a small amount of mashing of the kernel wall. It is almost impossible to do this without some mashing. The product produced by the best strippers always includes some cream. If there is too much mashing, too much cream is released, and the product becomes a pasty liquid with not enough chewy solid matter; and this is not preferred and may be destined to become feed for cattle with a great loss in monetary value by the processor. Accordingly, this invention includes a way to recover the corn kernels with as little destruction of the integrity of the kernel as possible.

Figure 1A:
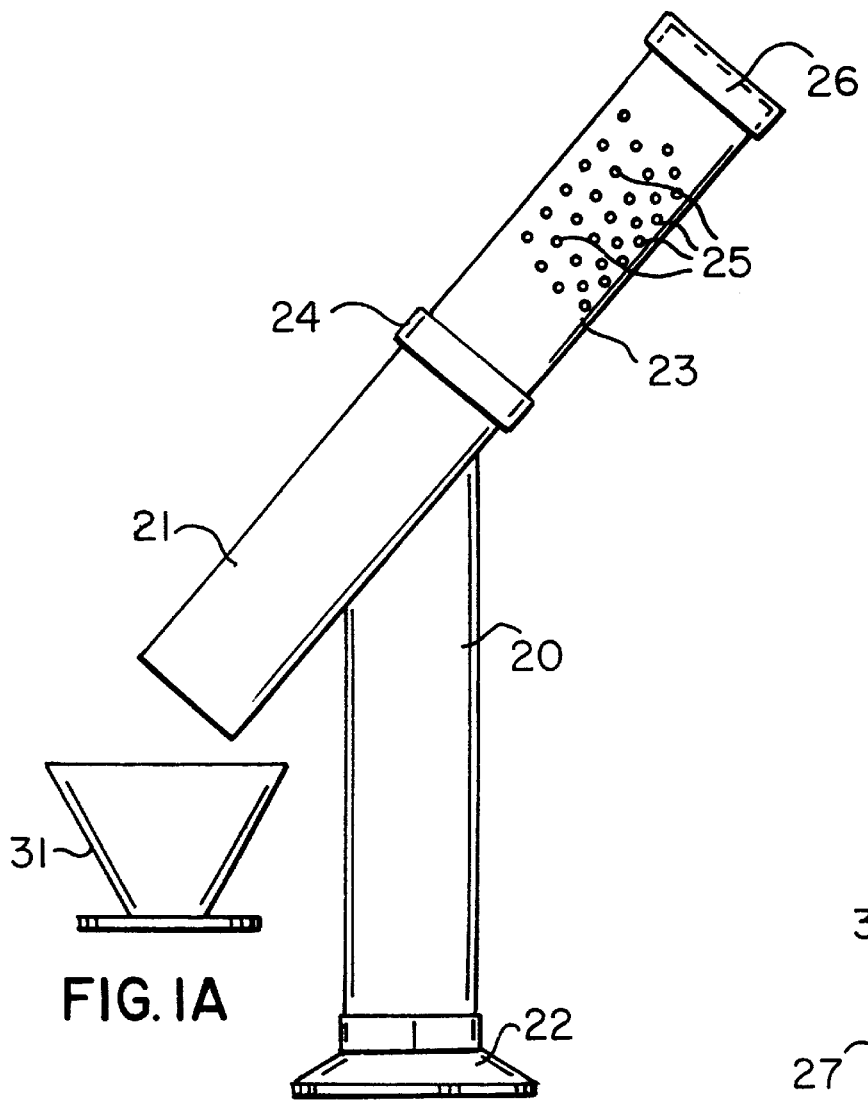
FIG. 1A is a side elevational view of the corn creaming device of this invention.

In the present invention the fresh corn cob 29 is affixed to the operational end of a hand-held electric drill in the same general fashion as a drill bit is affixed thereto, i.e. so that the drill will rotate the corn cob about its long axis. To cooperate with this action of the drill and the corn cob the remainder of the apparatus (see FIG. 1A) is a stationary tubular cutter 23 situated to receive the rotating ear of corn as it is pressed against cutters 25 which project inwardly of the walls of the tubular cutter 23. The speed of the rotation of the ear of corn 29 is fast enough to rip the kernels of corn from the cob with some small destruction of the kernel walls, and with an appropriate amount of cream released by this action. The success of this operation, of course, depends greatly on the skill of the operator of the electric drill 27. If the operator is heavy-handed and allows the corn cob to rest too heavily or too long against the cutters 25 the destruction of the kernel wall will be greater and mush more cream and pasty solids will be produced. The operator of the drill must practice the lightness of his touch in order to maximize his production of integral corn kernels and minimize the production of cream. The desired proportion of kernels-to-cream is easily reached by a skilled operator. Eventually the product of the cutting operation slides downwardly through tube 21 to be recovered in vessel 31, cooked and packaged for frozen food or canned. Tubes 21 and 23 may be joined together by a collar 24 to make a single tubular passageway. If both of tubes 21 and 23 are made of the same material, it may be possible to eliminate collar 24 by welding the tubes to each other. The materials of construction of these tubes might be stainless steel or plastic (i.e. thermoplastic if the ambient temperatures are low enough, or thermosetting if other conditions permit that use). Vertical standard 20 and base flange 22 may be any of the above-mentioned materials or any other suitable material. The junction between tubes 21 and 23 and vertical standard 20 may be made adjustable for height and/or angular direction; or the junction may be made nonadjustable. Generally the angular position of tubes 21 and 23 would preferably be about 30 to about 45 degrees from the vertical, but almost any chosen angle is workable if desired by the operator.

Figure 2A:
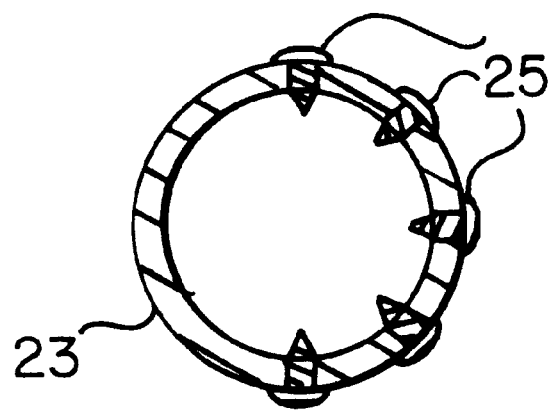
FIG. 2A is a longitudinal cross-sectional view of the corn cutting cylinder which forms a part of the device of FIG. 1A.
Figure 2B:
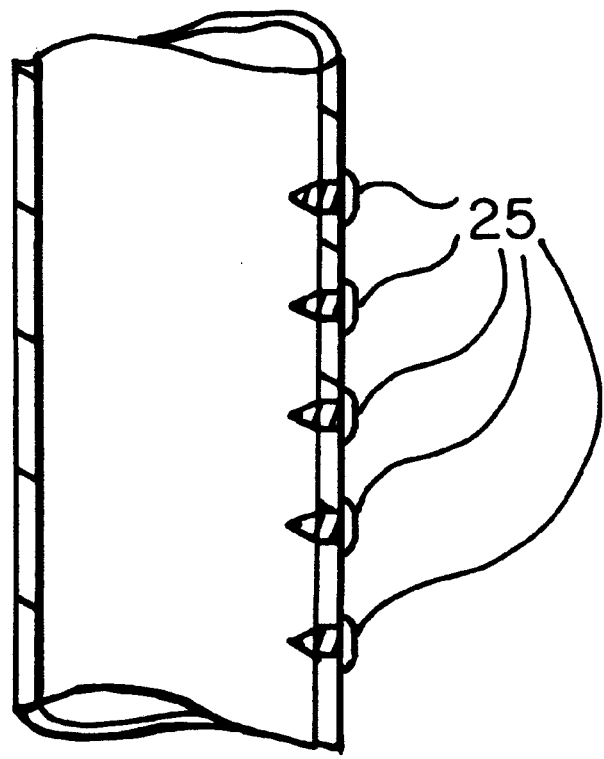
FIG. 2B is a lateral cross-sectional view of the corn cutting cylinder of FIG. 2A.

In FIGS. 2A and B there may be seen the details of cutter tube 23. The tube is made of any chosen material, stainless steel or thermoplastic preferred, and the walls are pierced with a plurality of screws 25 inserted from outside the tube and projecting slightly through the inside surface so as to present a plurality of screw points on the inside to cut kernels from the cob as it turns against the many screw points available. The screws 25 may be of any material although preferably they function better if they are the same material as that of tube 23 and the screws should be with sharp points so as to provide the cutting action desired. Vessel 31 may be of any chosen material: metal, glass, wood, plastic or the like.

Figure 1B:
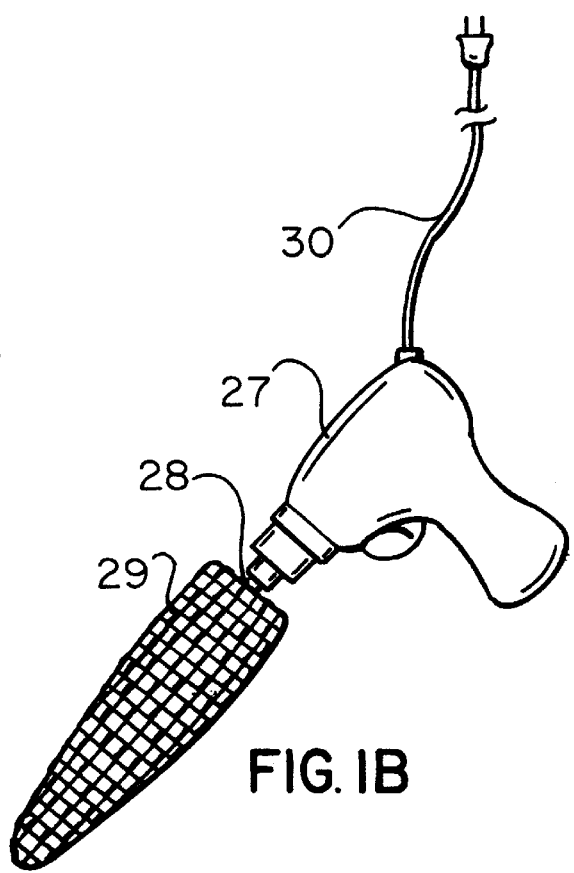
FIG. 1B is an illustrative drawing of the variable speed, reversible electric drill apparatus attached to an ear of corn to be processed by the device of FIG. 1A.

In FIG. 1B there is shown an electric hand drill. Any make or style is acceptable if it has an acceptable chuck and rotates at the right speed. There, of course may be some drills that operate at undesirable speeds, and trial-and-error will determine which speed performs best with different types of corn. It is recommended, however, that the drill is a reversible, variable speed drill, having a speed of about 1800 to about 3600 rpm. Higher or lower speeds can be chosen based on this initial speed. The drill bit 28 is a modified lag bolt of a suitable size (⅜ inch diameter being recommended as a starter) and with a square head or other suitable shape that can be grasped tightly by the chuck of the drill. The drill 27 should be reversibly driven so as to provide ease of removing jammed or spent cobs.

While the invention has been described with respect to certain preferred embodiments, it will be appreciated that many modifications and changes may be made by those skilled in the art without departing from the spirit of the invention.

What is claimed as new and what it is desired to secure by Letters Patent of the United States of America is:

1. An apparatus for extracting creamed corn from a fresh ear of shucked corn and recovering cut kernels and cream therefrom; said apparatus comprising an electric hand-held drill with a drill bit adapted to bore into a larger end of a corn cob and grip a single ear of corn with the tip of the ear of corn extending axially forward of said drill while the ear of corn is axially rotatable with and impaled on said bit; and a stationary tubular cutter with a coaxial tubular collector extending downwardly therefrom for guiding cut kernels and cream to a receiver, said tubular cutter and said tubular collector being supported at an acute angle to the upper end of a vertical column, said tubular cutter including a tubular wall generally sized to receive a single ear of corn, a plurality of spaced and radially directed screws attached to said wall with sharp points extending radially inside said tubular wall to cut kernels from a corn cob, said drill being movable toward said tubular cutter to insert the ear of corn being rotated by said drill into said tubular wall to cut and cream the kernels from the corn cob and thereafter said drill is moved away from said tubular cutter to withdraw the corn cob therefrom.

2. The apparatus of claim 1 which includes a dust and safety cap for covering an upper end of said tubular cutter when not in use.

3. The apparatus of claim 1 wherein said tubular cutter and said tubular collector are attached to said vertical column at an angle of about 30 to 45 degrees from vertical.

4. The apparatus of claim 1 wherein said tubular cutter and said tubular collector are formed of stainless steel.

5. The apparatus of claim 1 wherein said tubular cutter and said tubular collector are formed of thermoplastic material.

6. The apparatus of claim 1 wherein said screws are formed of stainless steel or aluminum.

7. The apparatus of claim 1 wherein said drill is reversible for more readily removing the corn cob from said tubular cutter after kernels and cream have been extracted from said ear of corn.

\* \* \* \* \*